(12) United States Patent
Elwell

(10) Patent No.: US 6,755,296 B2
(45) Date of Patent: Jun. 29, 2004

(54) SELF-PROPELLED BELT LOADER

(76) Inventor: Jack Elwell, 2230 N. Piper La., Eagle Mountain, UT (US) 84043

( * ) Notice: Subject to any disclaimer, the term of this patent is extended or adjusted under 35 U.S.C. 154(b) by 45 days.

(21) Appl. No.: 09/976,307

(22) Filed: Oct. 11, 2001

(65) Prior Publication Data

US 2003/0070900 A1 Apr. 17, 2003

(51) Int. Cl.$^7$ ................................. B65G 41/00
(52) U.S. Cl. .................... 198/304; 198/315; 198/316.1; 198/301
(58) Field of Search ................. 198/304, 315, 198/316.1, 318, 301

(56) References Cited

U.S. PATENT DOCUMENTS

| | | | |
|---|---|---|---|
| 3,184,045 A | | 5/1965 | Fry |
| 3,390,755 A | * | 7/1968 | Stacy .......................... 198/304 |
| 3,543,917 A | | 12/1970 | Duerksen |
| 3,712,489 A | * | 1/1973 | Jamison ...................... 414/528 |
| 4,273,500 A | * | 6/1981 | Yates .......................... 414/642 |
| 4,733,767 A | | 3/1988 | Anderson et al. |
| 4,782,938 A | * | 11/1988 | Cooper et al. .............. 198/301 |
| 5,143,194 A | * | 9/1992 | Sang .......................... 198/301 |

* cited by examiner

Primary Examiner—Richard W. Ridley
(74) Attorney, Agent, or Firm—Angus C. Fox, III

(57) ABSTRACT

A self-propelled aircraft cargo belt loader is both propelled and operated hydrostatically. An engine, an electric motor, or a hybrid combination of both provides a power source to operate first and second hydraulic pumps. The first, or primary pump, provides variable fluid pressure used to propel the vehicle., while the second, or secondary pump, provides constant fluid pressure used to drive the conveyor belt, operate the hydraulic cylinders used to raise and lower the conveyor belt, and operate the vehicle's steering. The use of a hydrostatic drive system facilitates off-center placement of both the powerplant and the conveyor belt system, with the powerplant and conveyor belt system being positioned on opposite sides of the vehicle. As the powerplant is not covered by the conveyor belt system, engine access for maintenance and replacement is greatly enhanced. In addition, the use of a hydrostatic drive permits the use of much smaller powerplants than would otherwise be required if a conventional automotive drivetrain with an automatic transmission were employed. The use of a smaller powerplant allows the transporting vehicle to be smaller and lighter. Fuel efficiency is also improved by using a small displacement engine.

18 Claims, 9 Drawing Sheets

SELF-PROPELLED BELT LOADER

FIELD OF THE INVENTION

This invention relates, generally, to endless conveyor systems and, more particularly, to vehicle-mounted, inclinable conveyors, such as those used adjacent a stationary aircraft, and which provide a moving, continuous conveyor belt surface for receiving, transporting, and depositing a series of items such as articles of baggage or cargo.

BACKGROUND OF THE INVENTION

Vehicle-mounted, inclinable conveyor belts are widely used in the aviation industry for loading and unloading aircraft. In the aviation ground support industry, such an apparatus is commonly called a belt loader. A typical belt loader has a conveyor belt which can be inclined to any position between level and a maximum height dictated by the design of the loader. The loaders are employed by placing them adjacent the fuselage of an aircraft, with the conveyor belt positioned generally perpendicular with the longitudinal axis of the fuselage, and with the elevated end of the conveyor belt placed at the bottom of an open cargo door. Depending on the conveyor belt's direction of movement, cargo items may be either loaded into or unloaded from the aircraft. A typical belt loader is incorporated into a specialized vehicle having its own propulsion system, steering system, braking system and, of course, a seat and controls for an operator.

Several aircraft cargo belt loaders are the subjects of U.S. patents. For example, U.S. Pat. No. 4,733,767 to Anderson, et al. discloses a Low Profile Aircraft Belt Loader having a pair of electric motors to power the drive wheels and an electrically-driven hydraulic pump for actuation of a hydraulic ram, which elevates the belt conveyor. Another such loader is disclosed in U.S. Pat. No. 3,543,917 to Duerksen. The conveyor of this device incorporates a series of horizontal platforms, articulared in sections, which travel an inclined, reversible cyclic path. An early truck-mounted aircraft belt loader is disclosed is U.S. Pat. No. 3,184,045 to Fry. The truck employs a conventional automotive drive train having an internal combustion engine, a clutch and transmission mounted to the rear of the engine, and a rear-axle-mounted differential coupled to the transmission with a drive shaft. The vehicle is operated from the left side of the vehicle, as the conveyor system takes up the right side thereof.

It appears that aircraft belt loaders were adapted from other industrial equipment, such as portable mine conveyors. U.S. Pat. No. 2,428,513 discloses such a conveyor.

Most, if not all, of the currently-available aircraft belt loaders feature a drive train that is positioned along the longitudinal axis of the vehcile, much like the belt-loader of Fry, above. However, instead of being offset from the center of the vehicle, the conveyor systems are also mounted such that they are centered about the longitudinal axis of the vehicle. Such a layout makes servicing the drive train difficult, as it sits beneath the conveyor belt system. In addition, because the belt is located above the drive train, the absolute minimum height of such equipment is engine height plus the thickness of the conveyor system. However, as a practical matter, as the engine is covered, there must be additional space between the cover and the top of the engine. Currently-available belt loaders generally utilize relatively large automotive engines of 3.3 to 5.0 liter displacement (200 to 300 c.i.d.) coupled to automatic-type transmissions. Such engines have a maximum power output of between 110 and 160 horsepower.

What is needed is a vehicle-mounted aircraft belt loader which is more compact and lighter than those now available, which does not have the drive train is not mounted beneath the conveyor belt system, which has an easily controllable propulsion system for safe maneuvering around expensive aircraft, which is economical to operate both from fuel consumption and engine longevity standpoints, and which is simple to maintain and repair.

SUMMARY OF THE INVENTION

The present invention answers the heretofore expressed needs for an improved vehicle-mounted aircraft belt loader. The improved aircraft belt loader is designed such that the operator and power plant are positioned one side of the vehicle, while conveyor system is positioned on the other side thereof. Although currently produced models place the driver and power plant on the left side of the vehicle, as is U.S. convention, with the conveyor belt system on the right side, these positions may be reversed with equivalent results. The power plant, which may be an internal combustion engine, an electric motor, or a hybrid combination of internal combustion engine, generator, storage battery and electric motor, drives primary and secondary hydraulic fluid pumps. The primary pump provides pressurized hydraulic fluid used by the propulsion system. The fluid is pressurized between about 500 p.s.i. and 3200 p.s.i., that is used for the propulsion system. The secondary pump, which provides pressurized hydraulic fluid at a pressure of about 1500 p.s.i., is used to steer the vehicle, operate hydraulic pistons used to raise and lower the conveyor system, and power the conveyor belt system. By using hydrostatic drive system for vehicle propulsion, a much smaller engine is required. Small displacement engines having a maximum output of from 22 to 28 horsepower are adequate for the application. Both diesel and gasoline internal combustion engines having displacements of less than 1.67 liter (100 c.i.d.) have been used for the application. For example, a Ford VSG413 in-line, 4-cylinder, 4-stroke-cycle, 79 c.i.d. gasoline engine, which produces 28 peak horsepower at 2,800 rpm has been used with success. In fact, as there is seldom any need for more than 17 or 18 horsepower, the engine can be operated at about 1,100 rpm. Such low speed operation results in extended engine life. In addition, such low power requirements require far less fuel consumption, and the much lower output engine is much smaller and lighter that those used in the presently-available conventional belt loaders.

PREFERRED EMBODIMENT OF THE INVENTION

The self-propelled aircraft cargo belt loader that is the focus of this disclosure features a number of significant improvements over existing technology. First, the unit is both propelled and operated hydrostatically. An engine, an electric motor, or a hybrid combination of both provides a power source to operate first and second hydraulic pumps. The first, or primary pump, provides variable fluid pressure used to propel the vehicle., while the second, or secondary pump, provides constant fluid pressure used to drive the conveyor belt, operate the hydraulic cylinders used to raise and lower the conveyor belt, and operate the vehicle's steering. The use of a hydrostatic drive system facilitates off-center placement of both the powerplant and the conveyor belt system, with the powerplant and conveyor belt system being positioned on opposite sides of the vehicle. As the powerplant is not covered by the conveyor belt system, engine access for maintenance and replacement is greatly enhanced. In addition, the use of a hydrostatic drive permits the use of much smaller powerplants than would otherwise be required if a conventional automotive drivetrain with an automatic transmission were employed. The use of a smaller powerplant allows the transporting vehicle to be smaller and lighter. Fuel efficiency is also improved by using a small displacement engine. The foregoing advantages will become readily apparent as the improved aircraft cargo belt loader is described with reference to the attached drawing FIGS. 1 through 9. It should be understood that the drawings are not necessarily drawn to scale, and should be considered as only illustrative of the invention.

Figure 1:
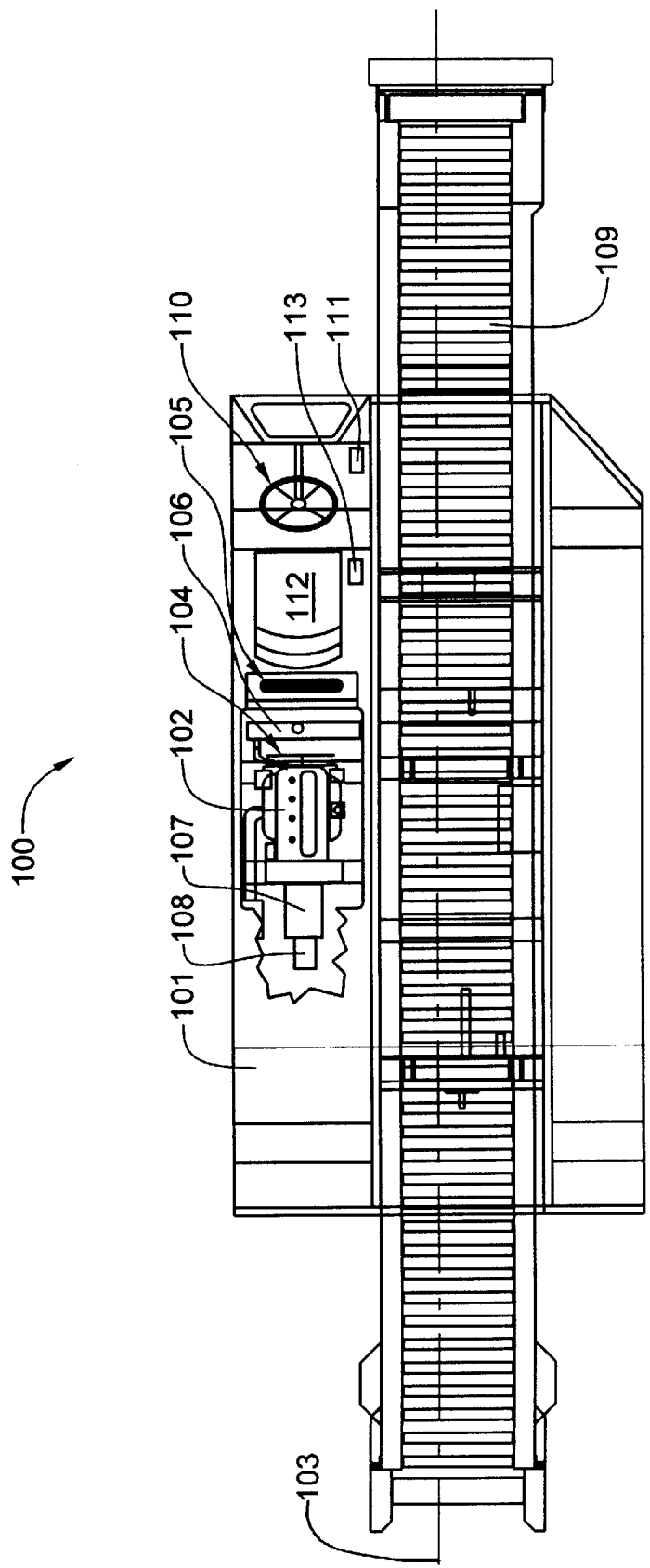
FIG. 1 is a top plan view of the hydrostatically powered belt loader.

Referring now to FIG. 1, the improved mobile belt loader 100 incorporates a unit-body chassis 101. The mobile belt loader may also be referred to as a vehicle, as it is, in fact, a vehicle to which a belt loader is attached. The chassis is preferably constructed from welded sheets of structural metal, such as mild steel or aluminum. A powerplant 102 is mounted at the far left of the chassis' longitudinal axis or centerline 103. The powerplant 102 may be an internal combustion engine (as actually shown) which operates using gasoline, diesel oil, liquified natural gas, propane, alcohol, or some other hydrocarbon-based fuel. Also as shown, a fan 104 pulls ambient air through an intake grill 105 on top of the chassis 101, and through a radiator 106, which provides cooling for the powerplant 102. Alternatively, the powerplant may be an electric motor operated by a battery pack. A hybrid arrangement, which would use an internal combusion engine to turn a generator which would charge the battery pack, may have an advantage in permitting the use of an even smaller engine.

Still referring to FIG. 1, the powerplant 102 drives a primary hydraulic pump 107, which provides pressurized hydraulic fluid that is used by the propulsion system. The hydraulic fluid is pressurized between about 500 p.s.i. and 3,200 p.s.i., the pressure being dependent on the speed of the powerplant 102. The primary hydraulic pump 107 is of the variable-displacement, pressure compensating type. Below a set threshold pressure, the pump allows any built-up pressure to escape. This type of pump is extremely adept at imitating the function of a conventional automatic transmission. As long as the pump is allowing built-up pressure to escape, the vehicle is in neutral, and no forward or reverse propulsion can occur. A secondary hydraulic pump 108 provides pressurized hydraulic fluid at about 1,500 p.s.i., that is used to drive a hydraulic motor which powers the conveyor belt 109, operate the hydraulic cylinders used to raise and lower the conveyor belt 109, and operate hydraulic cylinders which control the vehicle's steering. Neither the hydraulic motor used to power the conveyor belt 109, nor the hydraulic cylinders are shown in FIG. 1, but will be shown in other drawing figures.

Still referring to FIG. 1, it will be noted that the conveyor belt 109 is positioned offset to the right of the chassis' longitudinal axis or centerline 103 so that it does not cover either the powerplant 102 or the primary and secondary hydraulic pumps 107 and 108, respectively. It will also be noted that the chassis 101 is also equipped with a steering wheel 110, an accelerator pedal 111, a seat 112 for an operator, and hydraulic controls 113 for reversing the direction of the vehicle. Other controls (not shown) on the instrument panel are used to raise, lower and control the speed and direction of the conveyor belt 109.

Figure 2:
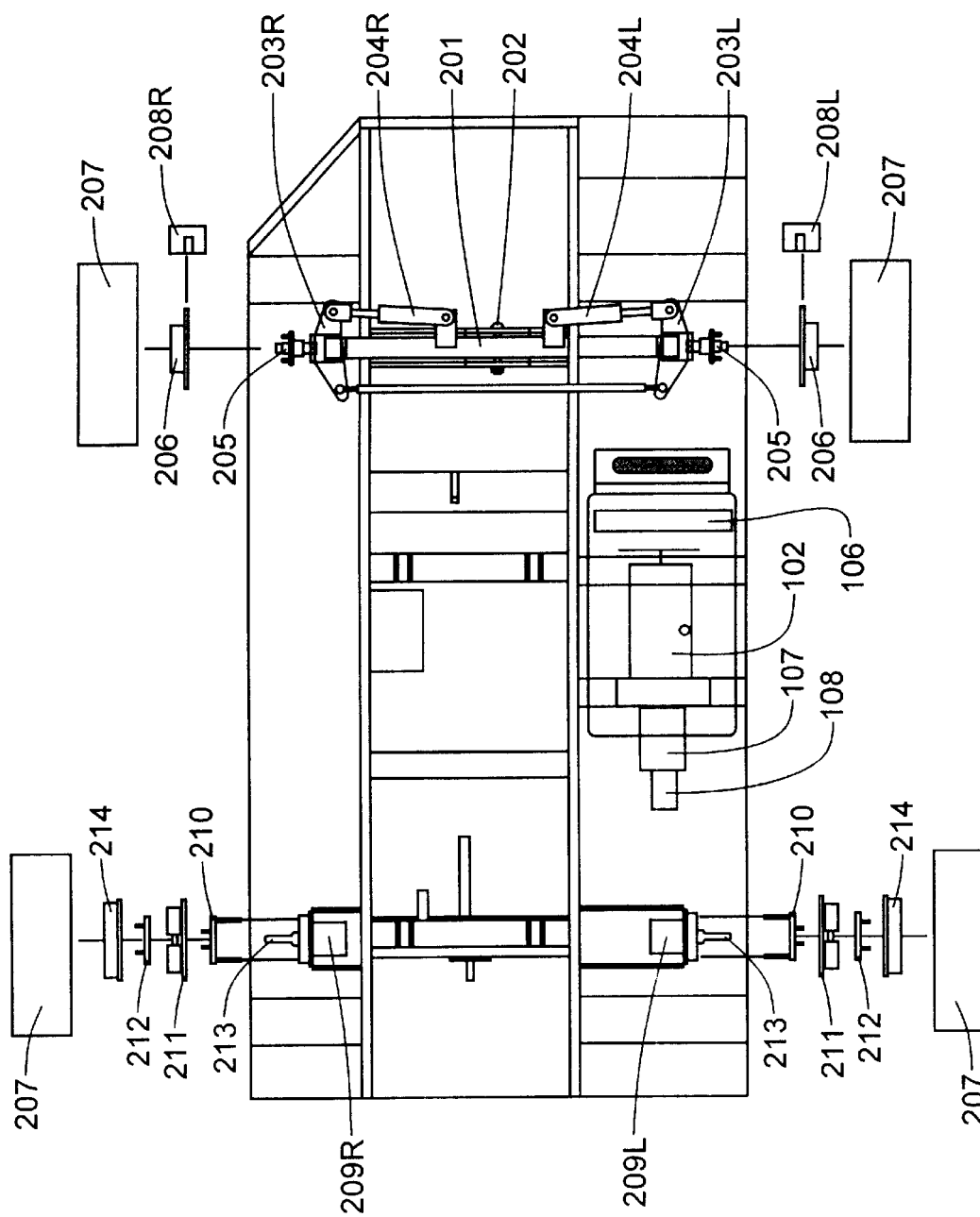
FIG. 2 is a bottom plan view of the hydrostatically powered belt loader with the conveyor system removed.

Referring now to bottom view of FIG. 2, additional features of the improved mobile belt loader 100 are visible. A steering axle 201 is attached to the chassis 101 at its center with a pivot pin 202, so that the axle 201 may rock back and forth to compensate for unlevel ground. The steering axle 201 has a steering knuckle, 203L and 203R, at left and right ends thereof, respectively. A pair of front-end hydraulic cylinders 204L and 204R provide steering control for the vehicle, one end of each cylinder, 204L and 204R, being attached to the axle 201, the other end being attached to a respective steering knuckle, 203L or 203R. Hydraulic pressure for the actuation of the cylinders is provided by the secondary hydraulic pump 108. Attached to each steering knuckle 203L and 203R is a front hub 205. A disk brake rotor 206 and a wheel and tire assembly 207 are attachable to each front hub 205. A disk brake caliper 208L and 208R is respectively attachable to each steering knuckle 203L and 203R. Although the braking system could be actuated by hydraulic pressure provided by the secondary hydraulic pump, it is simpler to use conventional brake components, including a conventional brake master cylinder (not shown), which are designed for an alcohol-based hydraulic fluid.

Still referring to FIG. 2, there is no rear axle, per se. Instead, a pair of hydraulic drive motors 209L or 209R are attached directly to the chassis 101. Both hydraulic drive motors 209L and 209R are powered by hydraulic fluid pressurized by the primary hydraulic pump 107. A backing plate mount 210 is attachable to a fixed portion of each drive motor 109L and 209R. A brake shoe backing plate 211 is attachable to each backing plate mount 210. A rear hub 212 is attachable to the output shaft 213 of each drive motor 209L and 209R, and a brake drum 214 and tire and wheel assembly 207 is attachable to each rear hub 212. It will be noted in this bottom view of the vehicle, that the powerplant 102 is also visible, as is a bottom grill 215, through which air is also drawn through the radiator 106.

Figure 3:
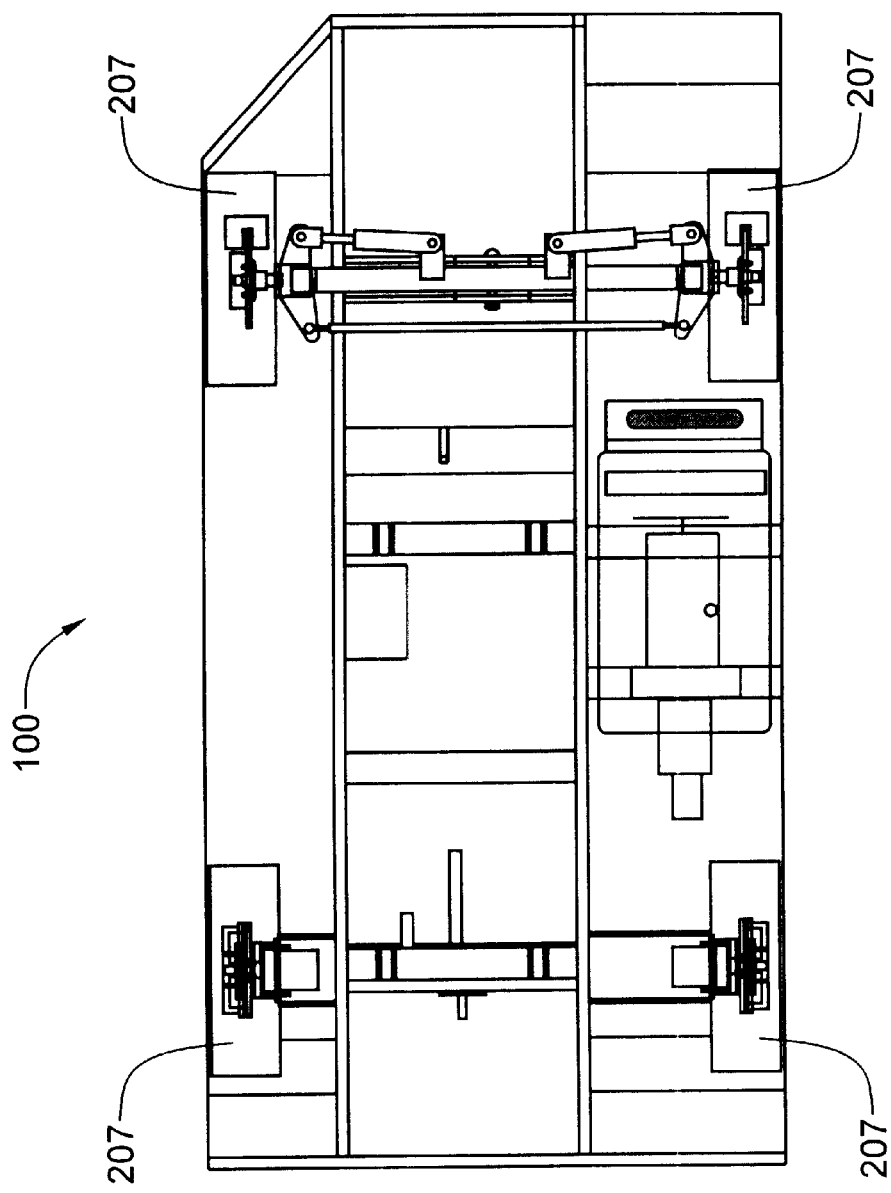
FIG. 3 is an exploded bottom plan view of the hydrostatically powered belt loader with the conveyor system removed.

Referring now to FIG. 3, this bottom view shows the vehicle assembled, with the wheel assemblies 207 and the drive and braking components attached to the vehicle 100.

Figure 4:
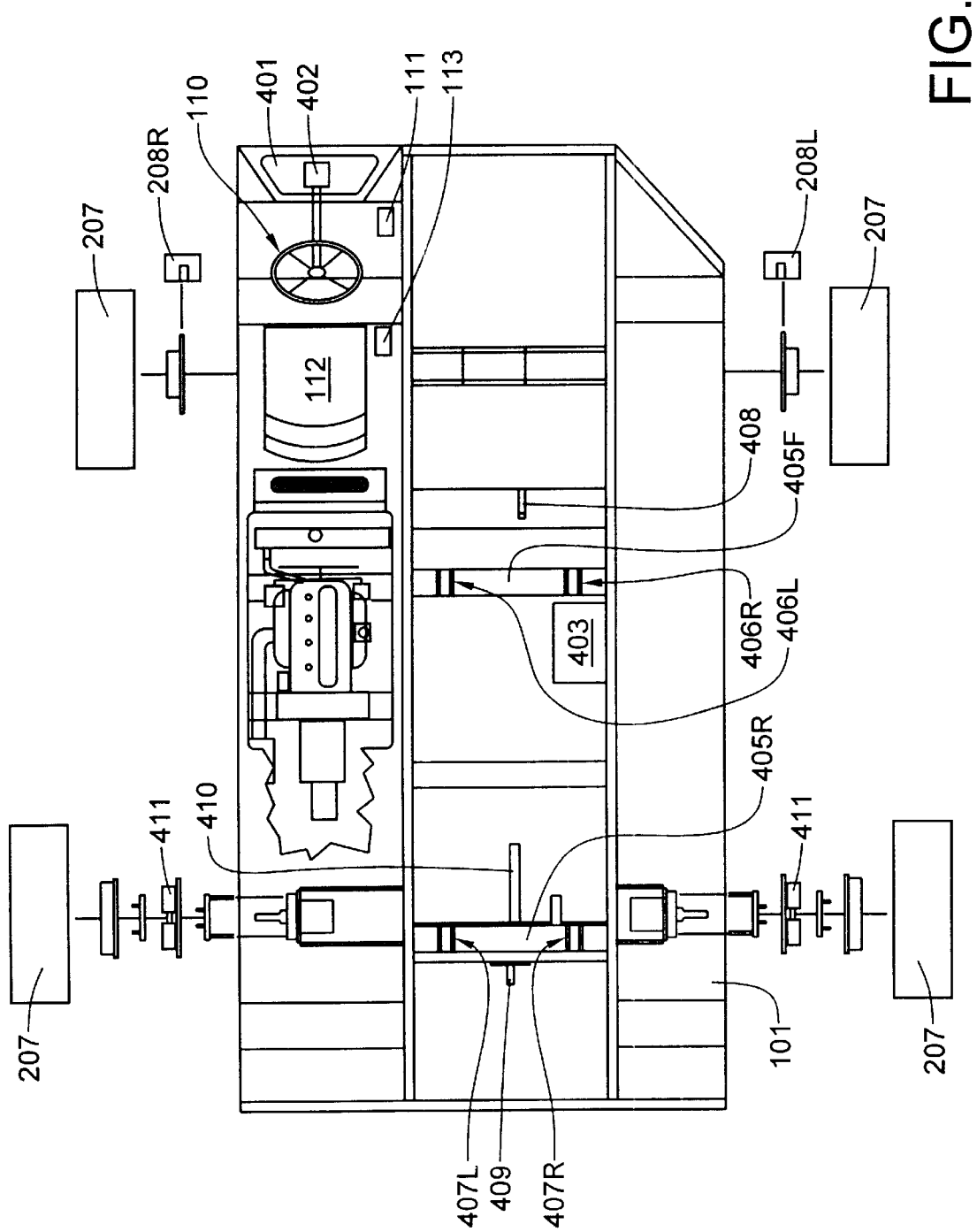
FIG. 4 is an exploded top plan view of the hydrostatically powered belt loader with the conveyor system removed.

Referring now to the top view of the mobile belt loader in FIG. 4, an access panel 401 may be removed to access a compartment behind an instrument panel. The accelerator pedal 111 is positioned on the floor of the vehicle. The steering wheel 110 operates hydraulic steering valves 402 which actuate the front-end hydraulic cylinders 204L and 204R, which control the steering of the vehicle's front wheels. A battery 403 mounted within the chassis 101 provides power to operate a starter motor and power various other electrical components such as headlights and taillights (not shown). A shift lever 404 provides control over the primary hydraulic pump for forward and reverse directions. The conveyor belt system is mounted on front and rear frame supports (not shown in this view. The front frame support hingeably mounts to a front-support-mount cross-member 405F via support brackets 406L and 406R, while the rear frame support hingeably mounts to a rear-support-mount cross-member 405R via rear support brackets 407L and 407R. One end a front hydraulic ram (not shown in this view) mounts to front hydraulic mount 408, while one end of a rear hydraulic ram (also not shown in this view) mounts to rear hydraulic mount 409. A parking brake mounting bracket 410 provides an anchor for the cables which control the brake shoes 411 in response to an operator setting a parking brake lever (not shown).

Figure 5:
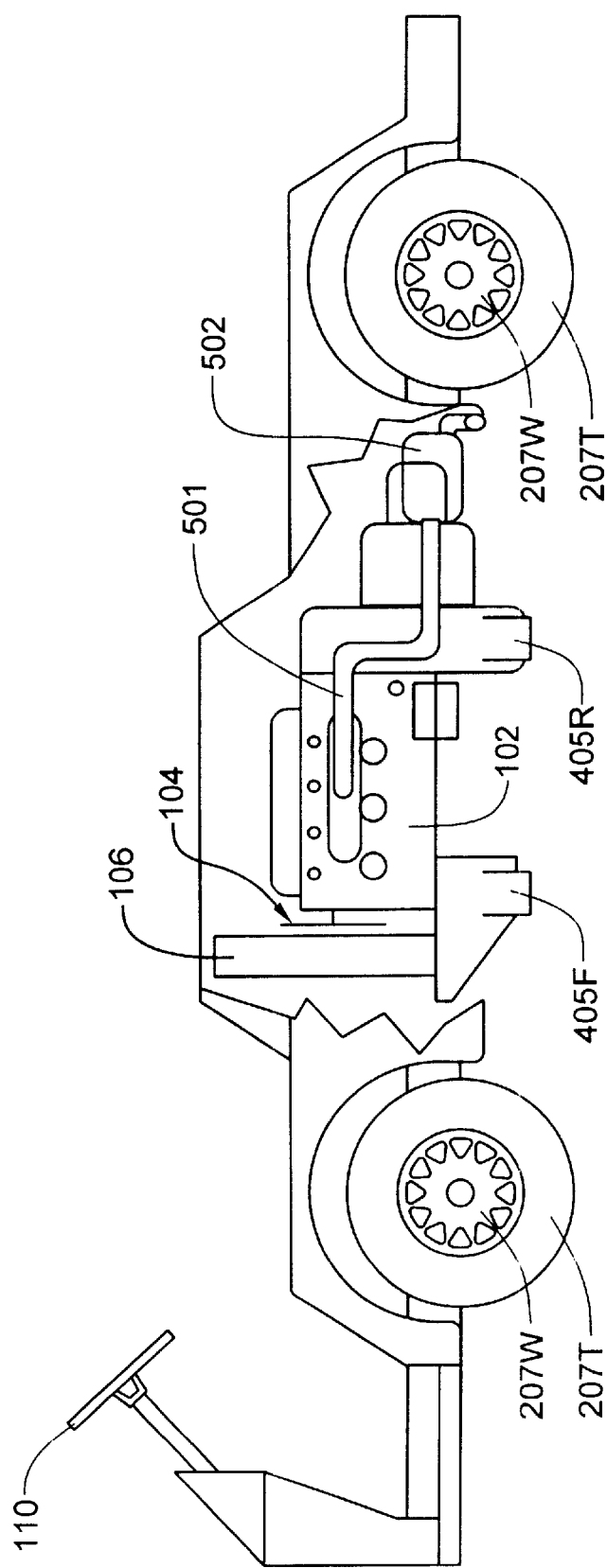
FIG. 5 is a left-side elevational view of the hydrostatically powered belt loader with the conveyor system removed.

Referring now to the left side view of FIG. 5, each wheel and tire assembly 207 consists of a wheel 207W and a tire 207T. An engine exhaust system 501 ducts exhaust gases to a muffler 502, from when they escape into the atmosphere. The front and rear support-mount cross members 405F and 405R, respectively, are visible in this view, as are the internal combustion engine powerplant 102, the fan 104 and radiator 106.

Figure 6:
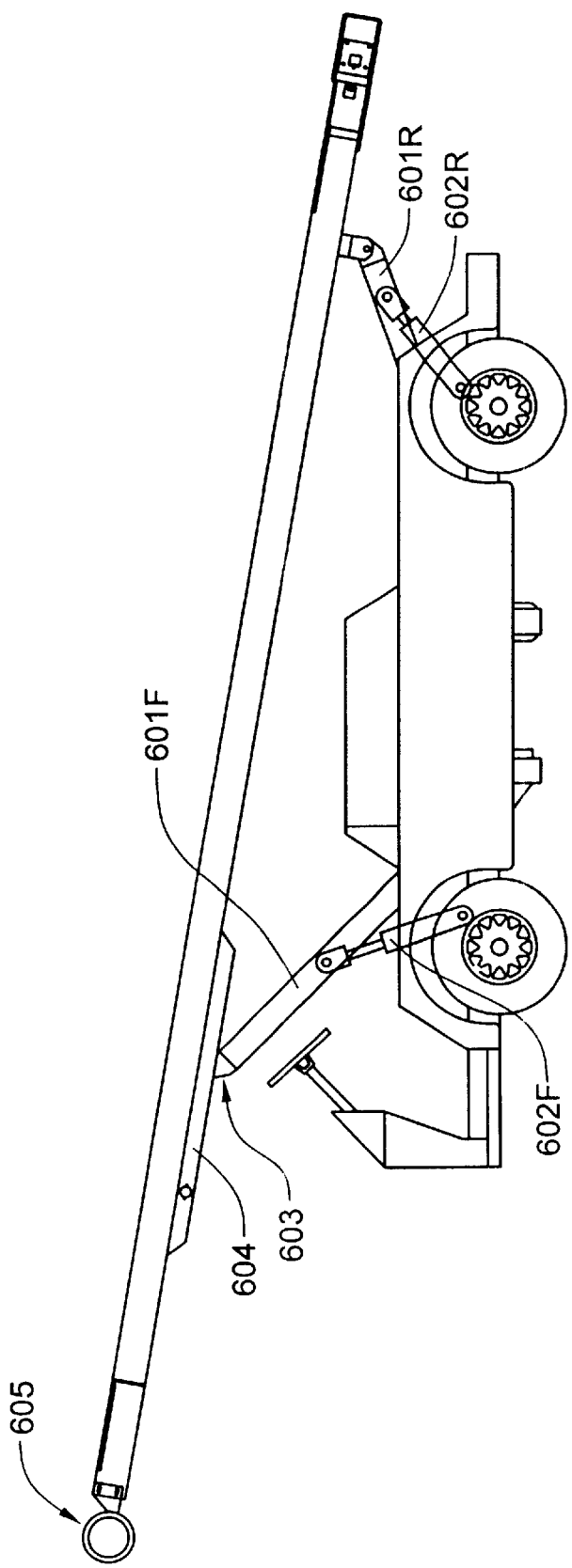
FIG. 6 is a right-side elevational view of the hydrostatically powered belt loader with the conveyor system removed.

Referring now to the left side view of the vehicle of FIG. 6, showing the conveyor belt 109 installed, the front frame support 601F is visible, as is the rear frame support 601R. The locations of the front and rear hydraulic rams 602F and 602R, respectively are also shown in a see-through format. It will be noted that the upper end 603 of the front frame support 601F is slidably mounted within a caged track 604. Thus as the front frame support 601F is raised by the front hydraulic ram 602F, the position of the upper end 603 moves from a forward-most location within the caged track 604 to a rear-most location when the front hydraulic ram 602F is in a state of maximum extension. The cylindrical device at the upper end of the conveyor system is a resilient bumper 605, which protects aircraft from damage which might otherwise be caused by the conveyor belt 109.

Figure 7:
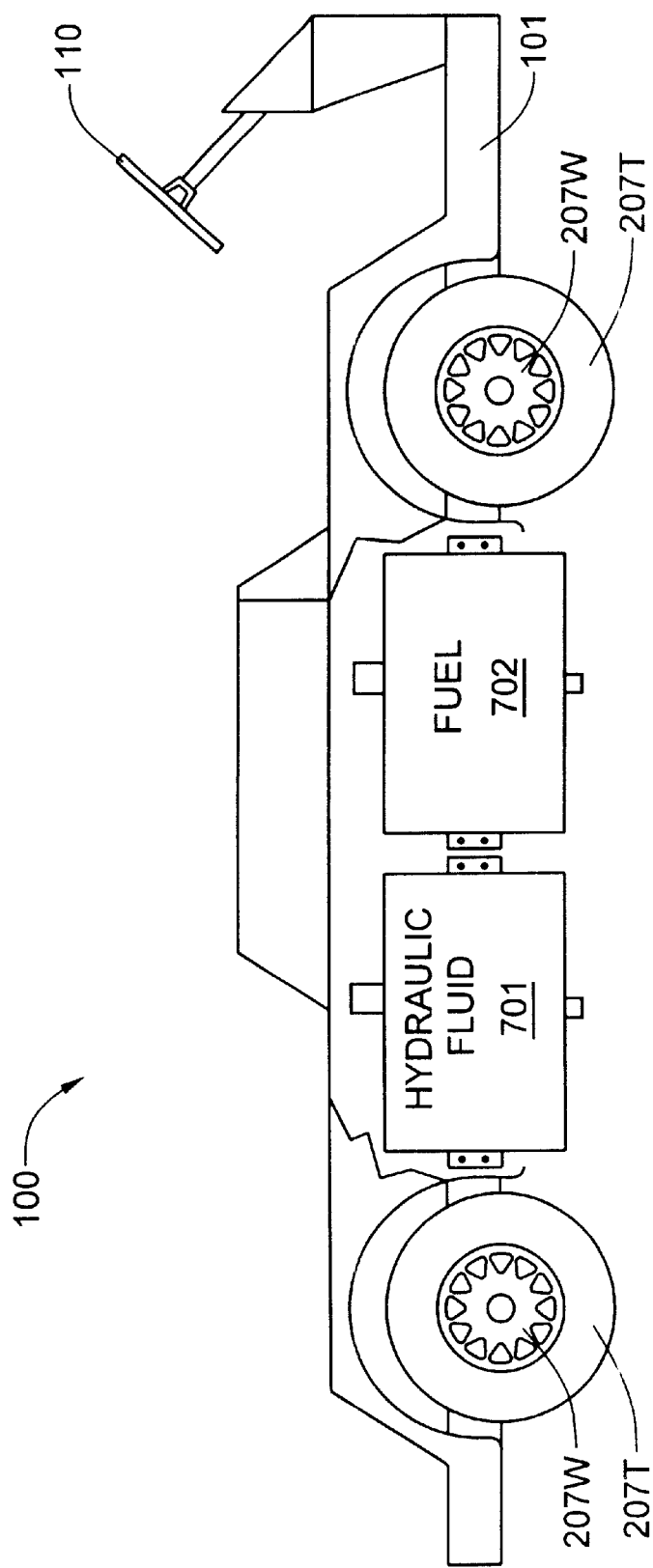
FIG. 7 is a left-side elevational view of the hydrostatically powered belt loader with the conveyor system installed.

Referring now to the right side view of the vehicle of FIG. 7, it will be noted that the right side of the vehicle is dedicated primarily to the storage of hydraulic fluid in a hydraulic fluid storage tank 701 and combustible fuel in a fuel storage tank 702. In the case of an electric motor-powered vehicle, the fuel storage tank 702 may be replaced with a rack on which are mounted several rechargeable electric storage batteries.

Figure 8:
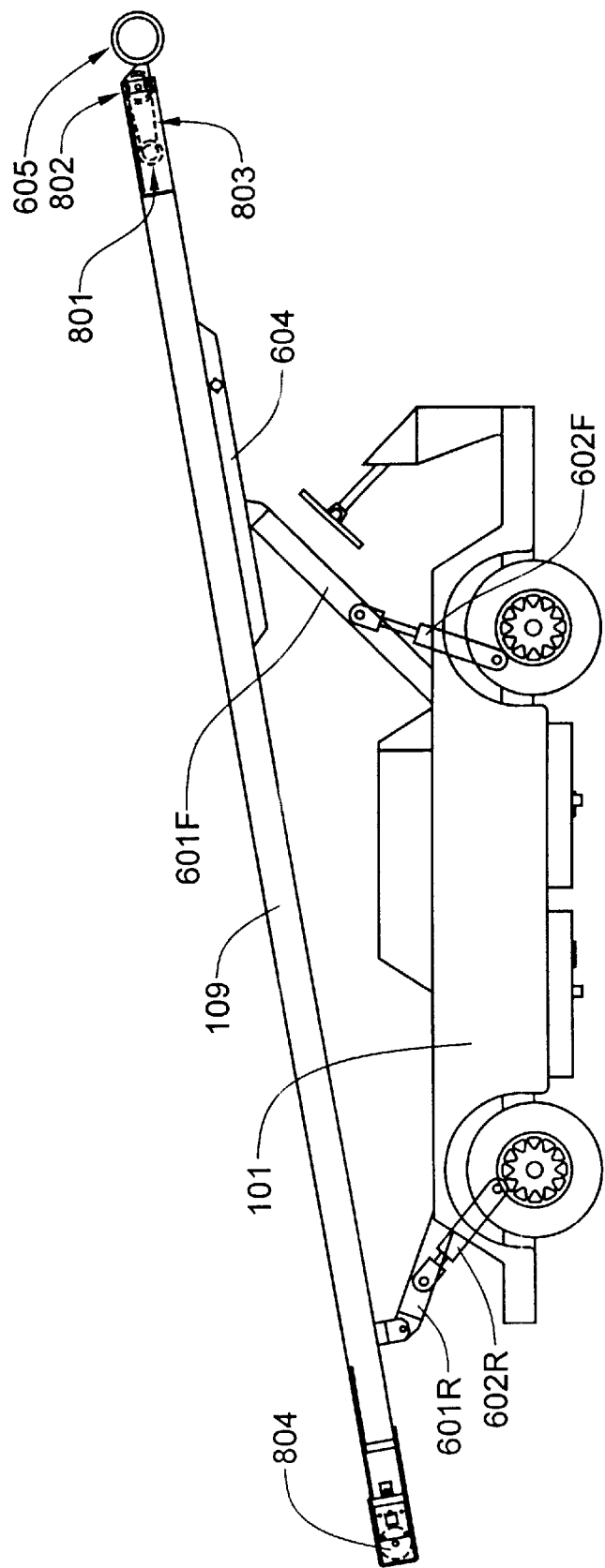
FIG. 8 is a right-side elevational view of the hydrostatically powered belt loader with the conveyor system installed.

Referring now to the right side view of the vehicle of FIG. 8, showing the conveyor belt 109 installed, the front and rear frame supports 601F and 601R, respectively are visible in this view, as are the front and rear hydraulic rams 602F and 602R, respectively. The conveyor belt is propelled in either a forward or reverse direction by a hydraulic conveyor motor 801, which is coupled to the forward roller 802 of the conveyor belt with a chain drive 803. The rear roller of the conveyor belt 804 is undriven.

Figure 9:
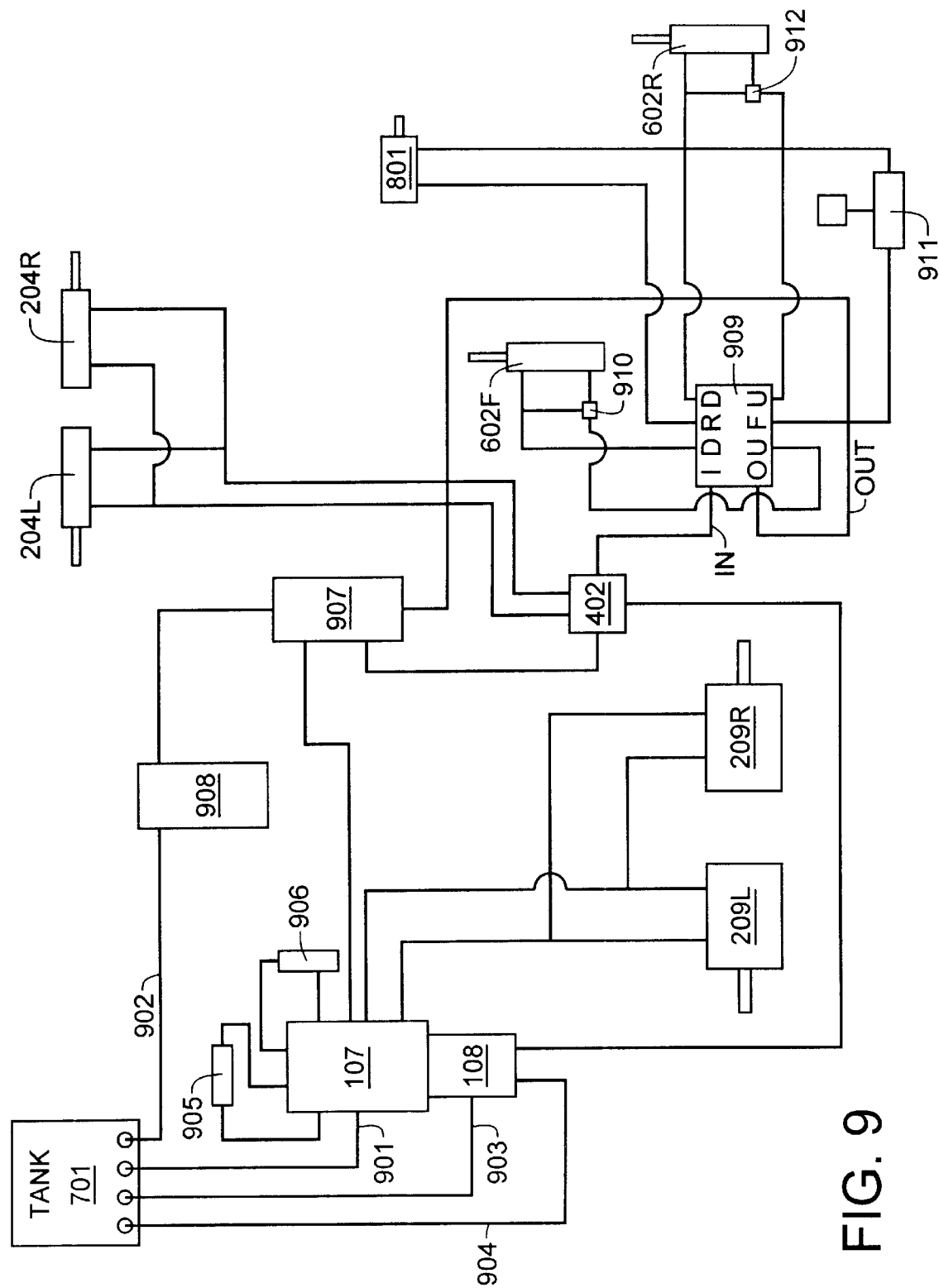
FIG. 9 is a schematic diagram of the hydraulic system.

Referring now to FIG. 9, the primary hydraulic pump 107 and the secondary hydraulic pump 108 receive hydraulic fluid from the hydraulic fluid tank 701 through supply lines 901 and 903, respectively. Return line 904 provides a return route for hydraulic fluid from the secondary hydraulic pump 108. A towing valve 905 is used to make the primary hydraulic pump 107 free wheeling so that the vehicle 100 may be towed. The primary hydraulic pump 107 provides hydraulic fluid under pressure to both the left and right drive motors 209L and 209R, respectively. A creep mode switch 906 is used to reduce power applied to the hydraulic drive motors 209L and 209R when approaching an aircraft. Hydraulic fluid from the primary hydraulic pump 107 returns to the tank 701 through a return manifold 907, a filter 908 and, finally, line 902. Hydraulic steering valves 402 receive hydraulic fluid under pressure from the secondary hydraulic pump 108. The steering valves 402 direct the fluid to the appropriate right or left front-end hydraulic cylinders 204L and 204R, respectively, as inputs are made by the vehicle operator by rotating the steering wheel 110. A control valve assembly 909 provides for up and down movement of both the front and rear hydraulic rams 602F and 602R, respectively, as well as forward and reverse control of the conveyor belt hydraulic motor 801. Flow of the hydraulic fluid to the conveyor belt motor 801 is through a flow controller 911. Counterbalance valves 910 and 912 are respectively employed in both front and rear hydraulic fluid control circuits, to prevent the rams from collapsing if a hydraulic line breaks or the pump fails.

What is claimed is:

1. A self-propelled belt loader comprising:
   a wheeled chassis;
   a conveyor belt longitudinally affixed atop the chassis
   a powerplant mounted within the chassis;
   first and second hydraulic pumps coupled to the powerplant, said first hydraulic pump being of the variable-displacement, pressure compensating type and providing pressurized hydraulic fluid to a pair of hydraulic drive motors, each of which drives a wheel on opposite sides of the chasis, for propulsion of the belt loader on the ground said second hydraulic pump providing pressurized hydraulic fluid utilized for raising, lowering, and propulsion of the conveyor belt.

2. The self-propelled belt loader of claim 1, wherein pressurized hydraulic fluid from the second hydraulic pump is also used to steer the vehicle.

3. The self-propelled belt loader of claim 1, wherein the powerplant and hydraulic pumps are mounted longitudinally within the chassis, being laterally offset from the conveyor belt so that the powerplant and the hydraulic pumps can be accessed from above, without removing the conveyor belt from the chassis.

4. The self-propelled belt loader of claim 1, wherein below a set threshold pressure, the first hydraulic pump allows any built-up pressure to escape so that it cannot be sent to the drive motors, thereby emulating the neutral gear position of an automatic transmission.

5. The self-propelled belt loader of claim 1, wherein the first hydraulic pump is equipped with a creep mode feature that can be selected to reduce power applied to the hydraulic drive motors when approaching an aircraft.

6. The self-propelled belt loader of claim 1, wherein the second hydraulic pump provides pressurized hydraulic fluid at a pressure of about 1,500 pounds per square inch.

7. The self-propelled belt loader of claim 1, wherein an operator's seat is positioned directly in front of the powerplant.

8. A self-propelled belt loader comprising:
   a wheeled chassis;
   an hydraulic fluid supply carried by the chassis;
   a conveyor belt longitudinally affixed atop the chassis;
   a powerplant mounted within the chassis;
   a first hydraulic drive motor attached to the chassis for providing motive power to a wheel on the left side of the loader;

a second hydraulic drive motor attached to the chassis for providing motive power to a wheel on the right side of the loader;

first and second hydraulic pumps coupled to the powerplant, the first hydraulic pump receiving hydraulic fluid from the supply, and pressurizing it for delivery to the first and second drive motors, the second hydraulic pump pressurizing hydraulic fluid received from the supply for use in propelling, lowering and raising the conveyor belt.

9. The self-propelled belt loader of claim 8, wherein pressurized hydraulic fluid from the second hydraulic pump is also used to steer the vehicle.

10. The self-propelled belt loader of claim 9, which further comprises left and right front-end hydraulic cylinders, which provide steering control for the loader via differential inputs controlled by positioning of a steering wheel.

11. The self-propelled belt loader of claim 8, wherein the powerplant and hydraulic pumps are mounted longitudinally within the chassis, being laterally offset from the conveyor belt so they can be accessed from above, without removing the conveyor belt from the chassis.

12. The self-propelled belt loader of claim 8, wherein the first hydraulic pump is of the variable-displacement, pressure compensating type.

13. The self-propelled belt loader of claim 8, wherein below a set threshold pressure, the first hydraulic pump allows any built-up pressure to escape so that it cannot be sent to the drive motors, thereby emulating the neutral gear position of an automatic transmission.

14. The self-propelled belt loader of claim 8, wherein the first hydraulic motor pump is equipped with a creep mode creep mode feature that can be selected to reduce power applied to the hydraulic drive motors when approaching an aircraft.

15. The self-propelled belt loader of claim 8, wherein the second hydraulic pump provides pressurized hydraulic fluid at a pressure of about 1,500 pounds per square inch.

16. The self-propelled belt loader of claim 8, wherein an operator's seat is positioned directly in front of the powerplant.

17. A self-propelled belt loader comprising:

a wheeled chassis;

a conveyor belt longitudinally affixed atop the chassis;

a powerplant longitudinally mounted within the chassis, laterally offset from the conveyor belt;

first and second hydraulic pumps longitudinally coupled to the powerplant, said first hydraulic pump providing pressurized hydraulic fluid to a pair of hydraulic drive motors for propulsion of the belt loader on the ground via a pair of independently driven wheels, said first hydraulic pump being equipped with a creep mode creep mode feature that can be selected to reduce power applied to the hydraulic drive motors when approaching an aircraft, said second hydraulic pump providing pressurized hydraulic fluid utilized for raising, lowering, and propulsion of the conveyor belt.

18. The self-propelled belt loader of claim 17, wherein the first hydraulic pump is of the variable-displacement, pressure compensating type, which allows any pressure generated therein below a set threshold, to escape so that it cannot be sent to the drive motors, thereby emulating the neutral gear position of an automatic transmission.

* * * * *